(12) United States Patent
Sui

(10) Patent No.: US 6,301,355 B1
(45) Date of Patent: Oct. 9, 2001

(54) METHOD AND APPARATUS FOR ANALYZING DUAL TONE MULTI-FREQUENCY (DTMF) SIGNALS ON A PRIVATE BRANCH EXCHANGE (PBX) SWITCH

(75) Inventor: Cliff Sui, Berkeley Heights, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/128,485

(22) Filed: Aug. 4, 1998

(51) Int. Cl.$^7$ .................................................. H04M 3/42
(52) U.S. Cl. .............................. 379/386; 379/282; 379/6
(58) Field of Search .................................. 379/386, 282, 379/283, 6, 31, 93.26, 167, 351

(56) References Cited

U.S. PATENT DOCUMENTS 5,406,621 * 4/1995 Binal ..................................... 379/386

OTHER PUBLICATIONS

Patricia Mock, "Add DTMF Generation and Decoding to DSP–µP Designs," EDN, 205–20) (Mar. 21, 1985).

Bell Communications Research, Dual–Tone Multifrequency Receiver Generic Requirements for End–to–End Signaling Over Tandem–Switched Voice Links, Technical Reference TR–tsy–000181, Issue 1 (Mar. 1987).

Texas Instruments, TMS320C1x, User's Guide, Assembly Language Instructions, Ch. 4 (Jul. 1991).

Paul M. Embree, C Algorithms for Real–Time DSP, 53–97 (Prentice Hall 1995).

Merlin Legend™ PBX, User's Manual, System Overview, 2–9 thru 2–15 (Jun. 1997).

* cited by examiner

Primary Examiner—Wing F. Chan
(74) Attorney, Agent, or Firm—Thomas J. Bean; Ryan, Mason & Lewis, LLP

(57) ABSTRACT

A touch-tone receiver (TTR) simulator is disclosed to analyze DTMF signals and facilitate the investigation of call failure problems. The TTR simulator captures DTMF data received by a private branch exchange (PBX) switch and utilizes the instruction set of the TTR being simulated to process the received DTMF signals on the simulated TTR. Diagnostic tools allow step-by-step tracing and recording of the instructions performed by the simulator. The TTR simulator allows the underlying cause of a call failure problem due to DTMF signals to be identified. Results of digit interpretation can be compared to expected results.

17 Claims, 6 Drawing Sheets

DTMF SIGNAL
DETECTION TABLE
500

FREQUENCY PEAKS OF DTMF DIGITS

|  |  | FREQ$_2$ (Hz) 540 | | |
|---|---|---|---|---|
|  |  | 1209 | 1336 | 1477 |
| FREQ$_1$ (Hz) 530 | 697 | 1 | 2 | 3 |
|  | 770 | 4 | 5 | 6 |
|  | 852 | 7 | 8 | 9 |
|  | 941 | * | 0 | # |

FIG. 5

METHOD AND APPARATUS FOR ANALYZING DUAL TONE MULTI-FREQUENCY (DTMF) SIGNALS ON A PRIVATE BRANCH EXCHANGE (PBX) SWITCH

FIELD OF THE INVENTION

The present invention relates to diagnostic tools for low cost private branch exchange (PBX) switches, and more particularly, to a method and apparatus for analyzing dual-tone multi-frequency (DTMF) signals.

BACKGROUND OF THE INVENTION

FIG. 1 shows a conventional network environment consisting of a central office switch 110 of the Public Switched Telephone Network (PSTN) and a PBX switch 130, such as the Merlin Legend™ PBX, interconnected by one or more DS1 digital trunks 120–122. The central office switch 110 may be embodied, for example, as the DMS-100 central office equipment, commercially available from Northern Telecom, Inc. of Ontario, Canada. While PBX switches typically process call dialing signals from the central office switch 110, the signals are generally DTMF signals. FIGS. 2a through 2c illustrate the spectrum of DTMF signals from the central office switch 110, corresponding to digits "3," "1" and "5," respectively. The DTMF signal for digit "1," for example, as shown in FIG. 2(b), will be the same regardless of the position of the "1" within a ten (10) digit telephone number.

As shown in FIG. 1, PBX switches, such as the switch 130, typically include a touch-tone receiver (TTR) 140 for receiving and processing the DTMF signals. The Legend™ PBX, for example, includes a TTR embodied as a TMS320C17 digital signal processor (DSP), commercially available from Texas Instruments, Inc., of Dallas, Tex.

Typically, the TTR 140 on a PBX switch 130, such as the Legend™ PBX, is a closed subsystem and does not provide an access interface to obtain information for diagnostic analysis. Generally, PBX switches, such as the switch 130, do not provide any diagnostic or debugging support for DTMF signals. Thus, the manner in which a PBX switch processes DTMF data is unknown. In addition, such PBX switches do not provide a mechanism for analyzing a call failure problem due to DTMF signals. Currently, it is difficult, if not impossible, to even collect DTMF data on such a PBX switch.

For example, it has been found that inbound calls from a central office switch 110 to a PBX switch 130 are likely to fail on a subset of extension numbers when certain dial plans are implemented. In particular, a high call failure rate has been observed on incoming PBX calls associated with extension numbers having a digit "1" in the dialed telephone number and followed by at least one additional digit, for example, extension "315" or "7150," even though the incoming DTMF signals comply with the DTMF specification. While preliminary investigations suggested a DTMF detection problem in the TTR of the PBX switch, the PBX switch does not have a diagnostic tool to identify the precise source of the call failure problem. The call failure problem cannot be reproduced with valid test scenarios in a laboratory environment. Furthermore, experimental trials on installed PBX systems are not practical, due to frequent service disruptions.

Since the source of the call failure problem could not be identified, the problem could also not be remedied. Thus, in order to avoid such call failures, PBX customers frequently did not assign extension numbers having a digit "1" followed by at least one additional digit, thereby limiting the effective capacity of the PBX switch.

As apparent from the above-described deficiencies with conventional PBX switches, a need exists for a diagnostic tool that analyzes DTMF signals on such PBX switches. A further need exists for a method and apparatus for simulating the processing of DTMF signals by a TTR. Finally, a need exists for a TTR simulator that facilitates the analysis and debugging of DTMF data.

SUMMARY OF THE INVENTION

Generally, a TTR simulator is disclosed to analyze DTMF signals and facilitate the investigation of call failure problems. According to a further aspect of the invention, the TTR simulator utilizes a general-purpose computing device to simulate the digital signal processing (DSP) instructions employed by a TTR in a PBX switch, such as the Merlin Legend™ PBX. In addition, the TTR simulator records the computational details of the TTR for subsequent data analysis. The TTR simulator allows details of the computation and processing results of the DTMF signals from the central office (CO) to be traced and recorded. In this manner, the TTR simulator allows the underlying cause of a call failure problem due to DTMF signals to be identified.

The TTR simulator captures DTMF data received by a PBX switch and utilizes simulated signal processing instructions to process the received DTMF signals on the simulated TTR. In addition, diagnostic tools to allow step-by-step tracing and recording of the instructions performed by the simulator. In this manner, results of digit interpretation can be compared to expected results.

A more complete understanding of the present invention, as well as further features and advantages of the present invention, will be obtained by reference to the following detailed description and drawings.

BRIEF DESCRIPTION OF THE DRAWINGS

FIG. 5 illustrates a sample table from the DTMF decoding table of FIG. 4;

DETAILED DESCRIPTION

Figure 1:
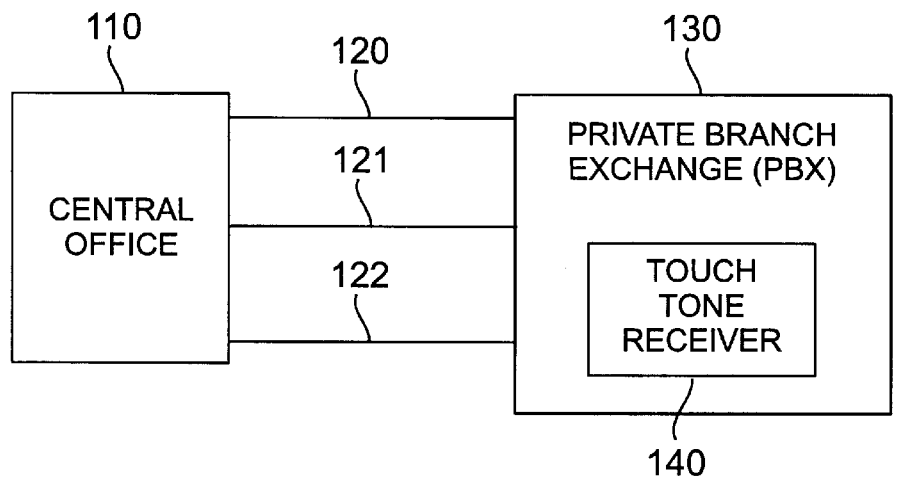
FIG. 1 illustrates a conventional network environment consisting of a central office switch and a PBX switch.
Figure 2A:
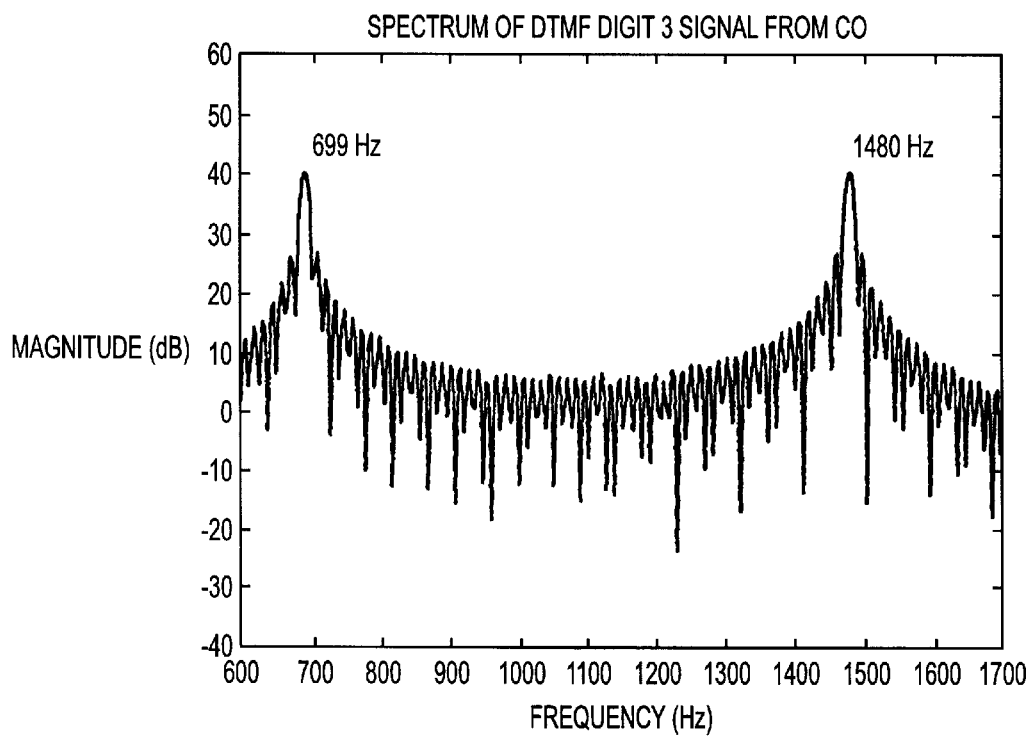
FIGS. 2a through 2c illustrate the spectrum of DTMF signals from the central office switch of FIG. 1, corresponding to digits "3," "1" and "5," respectively.
Figure 2B:
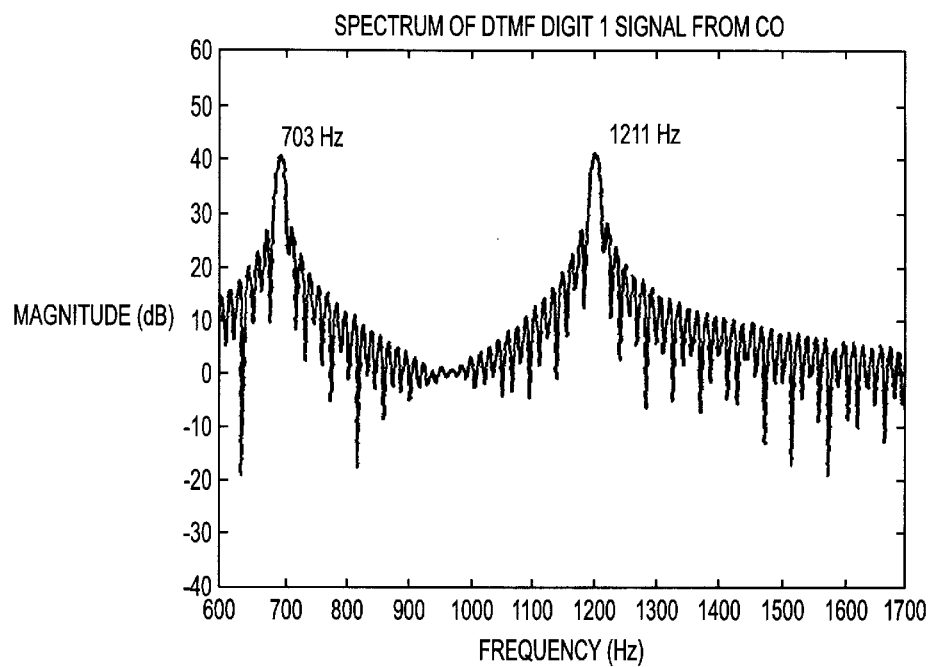
Figure 2C:
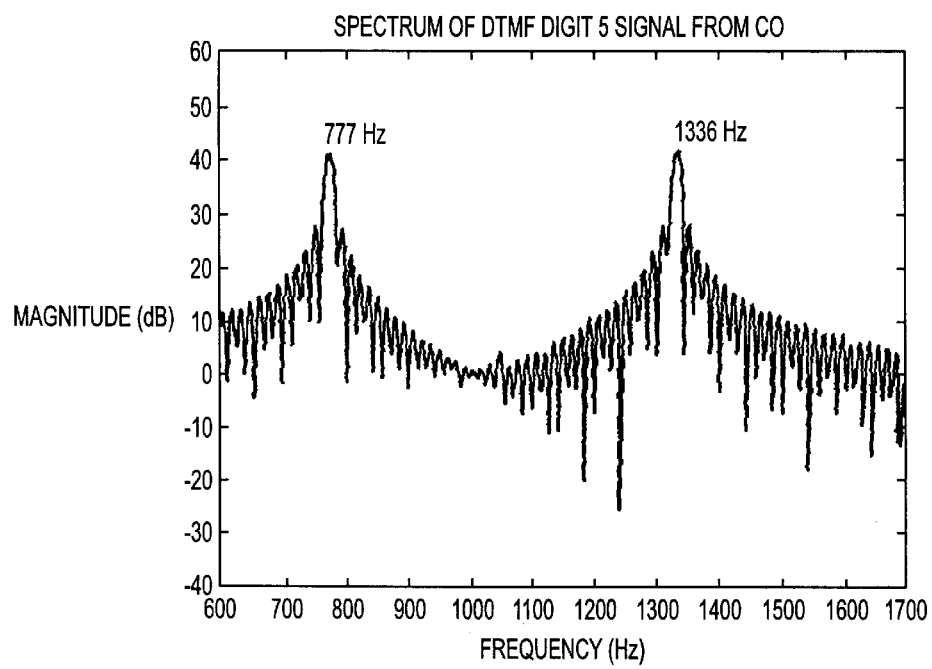
Figure 3:
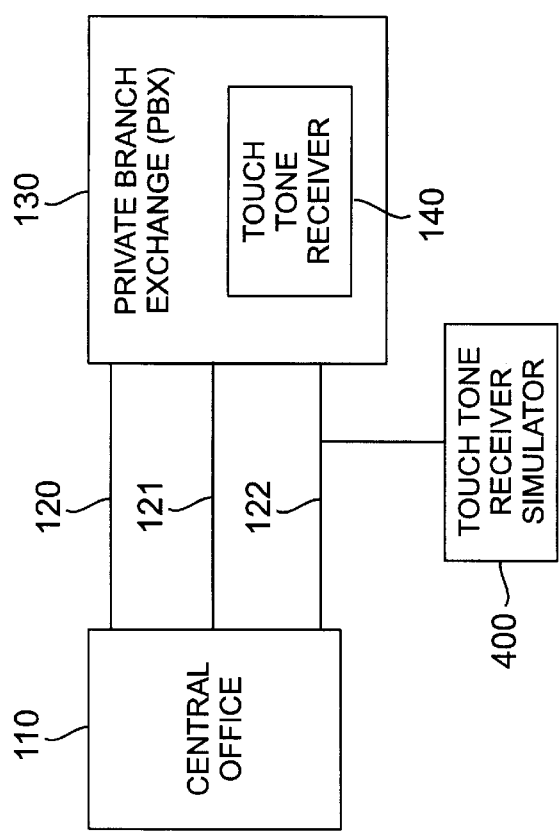
FIG. 3 illustrates a network environment that utilizes a TTR simulator to analyze DTMF signals between a central office switch and a PBX switch in accordance with the present invention.

FIG. 3 shows a network environment, similar to the environment of FIG. 1, consisting of a central office switch 110 of the Public Switched Telephone Network (PSTN) and a PBX switch 130, such as the Merlin Legend™ PBX, interconnected by one or more trunks 120–122. According to a feature of the present invention, a TTR simulator 400, discussed further below in conjunction with FIG. 4, records and analyzes the DTMF signals between the central office switch 110 and the PBX switch 130. Thus, the TTR simulator 400 behaves like a TTR and provides a diagnostic feature for PBX switches.

Generally, the TTR simulator 400 permits the processing of received DTMF signals by the TTR portion of a PBX switch to be analyzed. Initially, the TTR simulator 400 monitors one or more trunks 120–122 and captures the DTMF data in real-time as it is received by the PBX switch 130. Then, in a simulation mode, the TTR simulator 400 processes the received DTMF data in a step-by-step fashion utilizing the simulated signal processing instructions of the TTR. The simulation analysis may be performed off-line. As the TTR simulator 400 interprets each digit in the received DTMF signal, the accuracy of the interpretation is confirmed. In this manner, the TTR simulator 400 indicates the point at which a failure of DTMF processing occurs.

Figure 4:
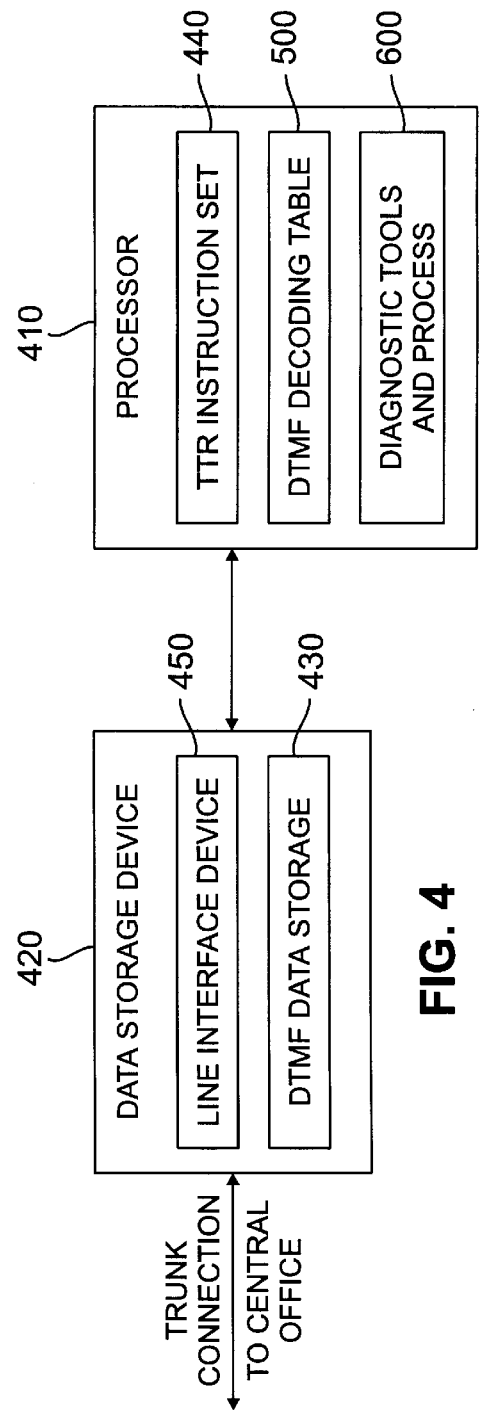
FIG. 4 is a schematic block diagram of the TTR simulator of FIG. 3.

FIG. 4 is a schematic block diagram showing the architecture of an illustrative TTR simulator 400 of FIG. 3. The TTR simulator 400 includes known hardware components, such as a central processing unit 410 in communication with a data storage device 420. As shown in FIG. 4, the data storage device 420 includes an area of memory 430 for recording the DTMF signal received by the PBX switch 130. As previously indicated, the TTR simulator 400 preferably captures the DTMF data in real-time as it is received by the PBX switch 130. The data storage device 420 includes a trunk interface device 450 for connecting to the trunk from the central office switch 110 for non-intrusive data recording. The data storage device 420 is operable to store the recorded data, which the CPU 410 is operable to retrieve, interpret and execute.

In addition, the processor 410 includes the instruction set 440 of the TTR being simulated, a DTMF decoding table 500, discussed below in conjunction with FIG. 5, and a set of simulation and diagnostic tools and process 600, discussed below in conjunction with FIG. 6.

Generally, the TTR instruction set 440 includes the set of commands utilized by the TTR in the PBX switch 130 to receive, detect and interpret DTMF signals. For a more detailed discussion of the instruction set of the representative TMS320C17 digital signal processor (DSP) TTR on the Legend™ PBX, see TMS320C1X User's Guide, incorporated by reference herein.

Some examples of the simulated TTR instruction set 440 are shown below. All instructions needed to simulate the TTR are implemented in the same fashion to provide processing details for analysis.

EXAMPLE 1

```
void
ZAC₀
{
   ACC=0;
   if (DBG(DBG_REG)) printf ("0x%x ZAC→ACC=
      0x%x\n', PC, ACC);
   PC++;
{
```

The ZAC routine simulates the processing instruction which clears the contents of the accumulator, ACC, to zero and increments the program counter, PC.

EXAMPLE 2

```
void
LTA (short xi)
```

```
   T_reg=xi;
   ACC=ACC+P_reg;
   if (DBG(DBG_REG))
   {
      printf ("0x%x LTA→P=0x%x, ACC=0x%x,
         T=0x%x, arg=0x%x\n', PC, P_reg, ACC, T_reg,
         xi);
   {
   PC++
{
```

The LTA routine simulates the operation of loading register T with the contents of specified data variable, and then adding the contents of register P to the accumulator, ACC.

The DTMF decoding table 500, shown in FIG. 5, is a look-up table that indicates the frequency components corresponding to each DTMF signal. As shown in FIG. 5, the DTMF decoding table 500 maintains a plurality of records, each associated with a different DTMF digit. For each DTMF digit, the DTMF decoding table 500 indicates the expected frequency of each peak in fields 530 and 540, as well as the corresponding interpreted digit.

Figure 6:
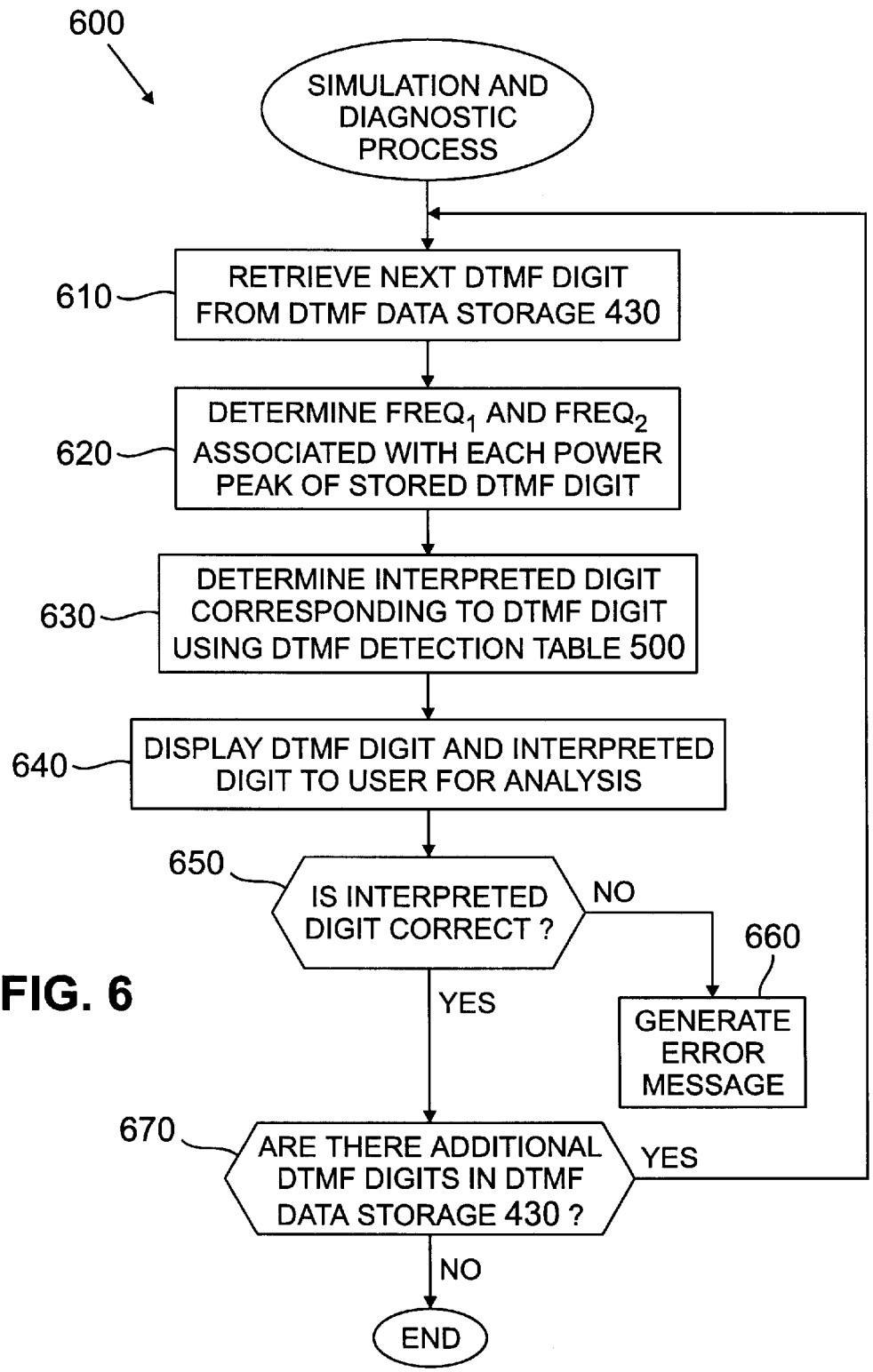
FIG. 6 is a flow chart describing an exemplary simulation and diagnostic process implemented by the TTR simulator 400 of FIG. 4.

The simulation and diagnostic tools and process 600, shown in FIG. 6, provide a user interface that allows the user to process the received DTMF signals in a step-by-step fashion until a failure occurs. In addition, the simulation and diagnostic tools and process 600 permit the TTR simulator 400 to output the interpreted digits as the received DTMF data is processed by the TTR simulator 400. In this manner, the TTR simulator 400 allows the interpretation of fixed-point data.

As shown in FIG. 6, the simulation and diagnostic tools and process 600 initially retrieves a DTMF digit from the DTMF data storage 430 (previously captured on a trunk 120–122) during step 610. Thereafter, the frequency of each power peak, $Freq_1$, and $Freq_2$, in the retrieved DTMF digit are determined during step 620, and the interpreted digit, corresponding to the measured frequency values are obtained during step 630 using the DTMF decoding table 500.

The DTMF digit and corresponding interpreted digit are presented to the user during step 640 for analysis. A test is then performed during step 650 to determine if the interpreted digit is correct. If it is determined during step 650 that the interpreted digit is not correct, then an error message is generated during step 660. If, however, it is determined during step 650 that the interpreted digit is correct, then a further test is performed during step 670 to determine if there are additional recorded DTMF digits to be processed.

If it is determined during step 670 that there are additional recorded DTMF digits to be processed, then program control returns to step 610 and continues in the manner described above. If, however, it is determined during step 670 that there are no additional recorded DTMF digits to be processed, then program control terminates.

Figure 7:
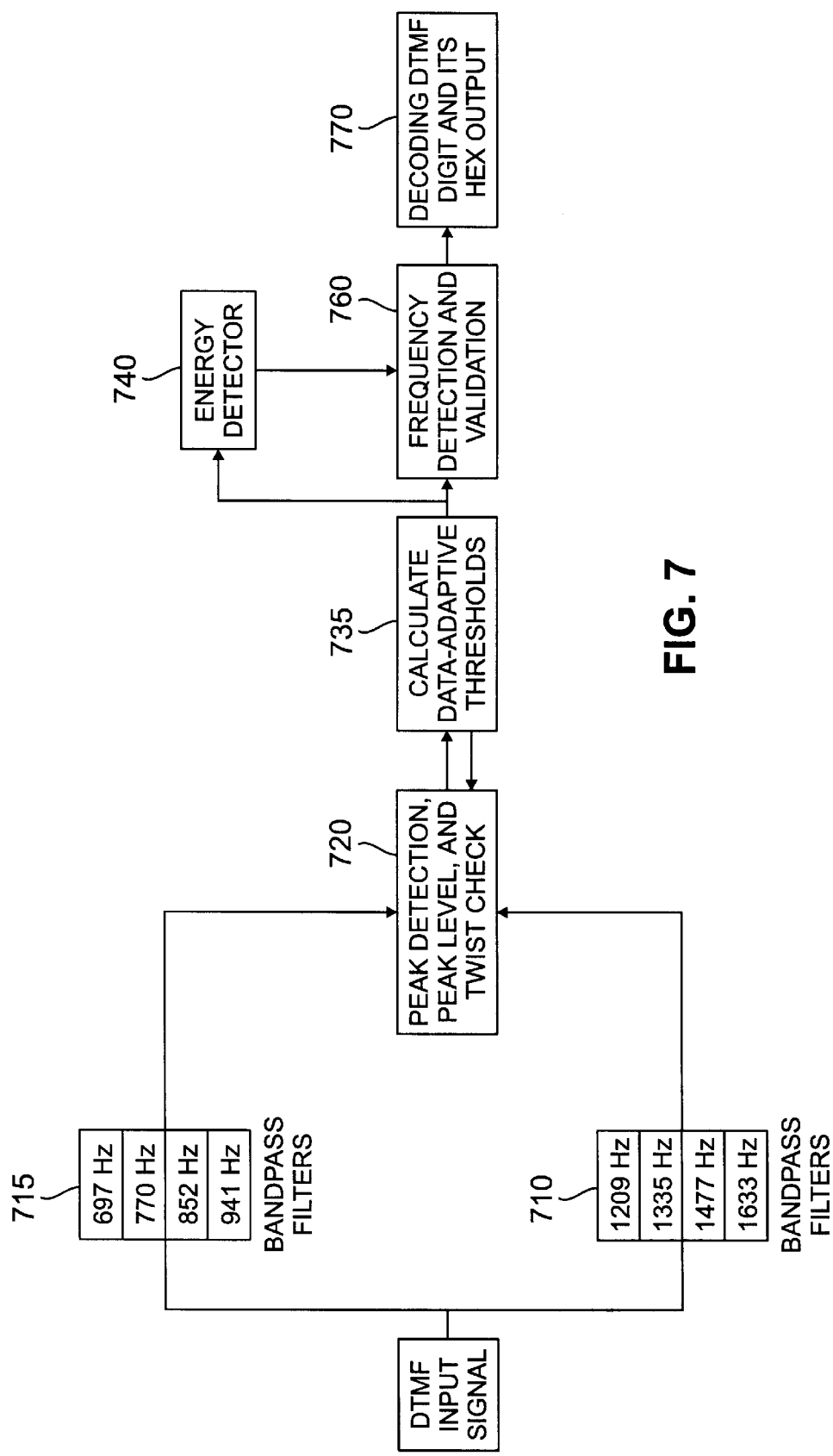
FIG. 7 is a block diagram illustrating a software and hardware implementation of the simulation and diagnostic process of FIG. 6.

A schematic block diagram of a software and hardware implementation of the simulation and diagnostic tools 600 is shown in FIG. 7. As shown in FIG. 7, the DTMF input signal is initially subjected to a pair of band pass filters 710, 715, corresponding to the expected DTMF frequency peaks in the low and high frequency bands, respectively. Thereafter, the filtered DTMF signal is analyzed to determine if a peak exists in each of the low and high frequency bands.

Specifically, a frequency peak and level detector 720 determines the amplitude of any peaks in each of the frequency bands, and a peak detector counts the number of peaks over the entire frequency spectrum. In addition, a data adaptive thresholding stage 735 ensures that any peaks are not merely impulses. A minimum energy detector 740 ensures that the signal strength in each frequency band exceeds the noise, checks for inter-digit pause and an end-of-tone burst.

A frequency detector 760 determines the frequency of each peak and confirms that each peak corresponds to an appropriate DTMF frequency. After the frequency of each peak is obtained, a decision is made about the interpreted digit by a decoder 770.

It is to be understood that the embodiments and variations shown and described herein are merely illustrative of the principles of this invention and that various modifications may be implemented by those skilled in the art without departing from the scope and spirit of the invention.

I claim:

1. A method of analyzing a DTMF signal received by a private branch exchange (PBX) switch, said PBX switch receiving said DTMF signal using a touch-tone receiver (TTR), said method comprising the steps of:

simulating said TTR on a general purpose computing device;

processing said DTMF signal on said simulated TTR;

recording instructions that are executed while processing said DTMF signal on said simulated TTR; and evaluating the interpretation of said DTMF signal.

2. The method according to claim 1, further comprising the step of recording said DTMF signal received by said PBX switch.

3. The method according to claim 1, wherein said simulating step includes the step of decoding said DTMF signal using an instruction set of said TTR.

4. The method according to claim 1, wherein said simulating step includes the step of behaving like said TTR.

5. The method according to claim 1, further comprising the step of determining if a digit value assigned to said DTMF signal corresponds to an expected value.

6. A tool for analyzing a DTMF signal received by a private branch exchange (PBX) switch, said PBX switch receiving said DTMF signal using a touch-tone receiver (TTR), said tool comprising:

a software model of said TTR;

a processor for processing said DTMF signal using said software model of said TTR;

a memory for recording instructions that are executed while processing said DTMF signal using said software model of said TTR; and means for evaluating the interpretation of said DTMF signal.

7. The analysis tool according to claim 6, further comprising an instruction set of said TTR for processing said DTMF signal.

8. The analysis tool according to claim 6, wherein said testing tool behaves like said TTR.

9. The analysis tool according to claim 6, further comprising a data storage device for recording said DTMF signal received by said PBX switch.

10. The analysis tool according to claim 6, wherein said software model decodes said DTMF signal using an instruction set of said TTR.

11. The analysis tool according to claim 6, wherein said processor determines if a digit value assigned to said DTMF signal corresponds to an expected value.

12. A tool for analyzing a DTMF signal received by a private branch exchange (PBX) switch, said PBX switch receiving said DTMF signal using a touch-tone receiver (TTR), said tool comprising:

means for simulating said TTR on a general purpose computing device;

a processor for processing said DThF signal on said simulated TTR;

a memory for recording instructions that are executed while processing said DTMF signal using said software model of said TTR; and means for evaluating the interpretation of said DTMF signal.

13. The analysis tool according to claim 12, further comprising an instruction set of said TTR for processing said DTMF signal.

14. The analysis tool according to claim 12, wherein said testing tool behaves like said TTR.

15. The analysis tool according to claim 12, further comprising means for recording said DTMF signal received by said PBX switch.

16. The analysis tool according to claim 12, wherein said simulated TTR decodes said DTMF signal using an instruction set of said TTR.

17. The analysis tool according to claim 12, wherein said processor determines if a digit value assigned to said DTMF signal corresponds to an expected value.

* * * * *